Patented Mar. 30, 1937

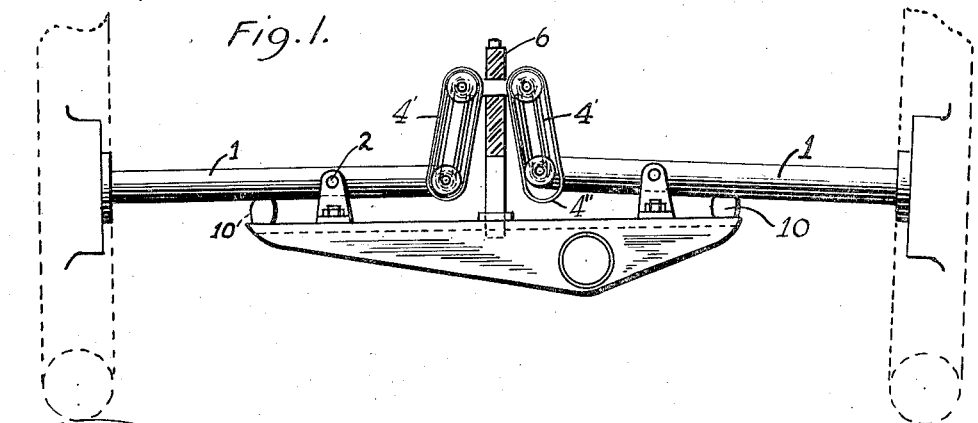
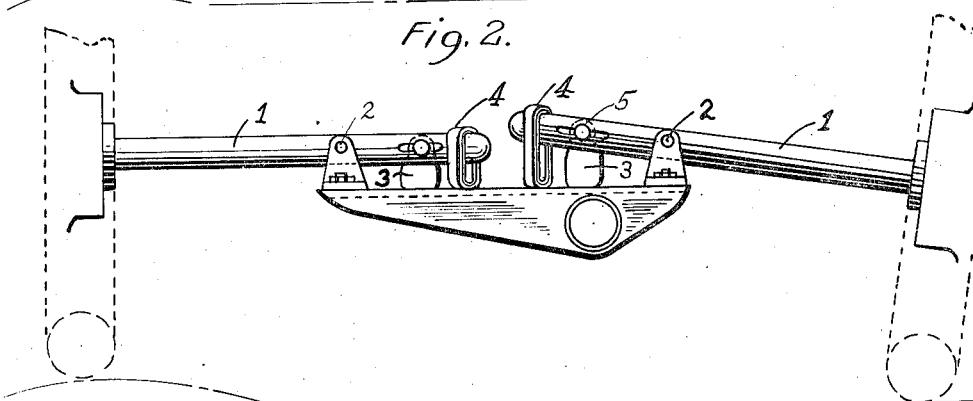
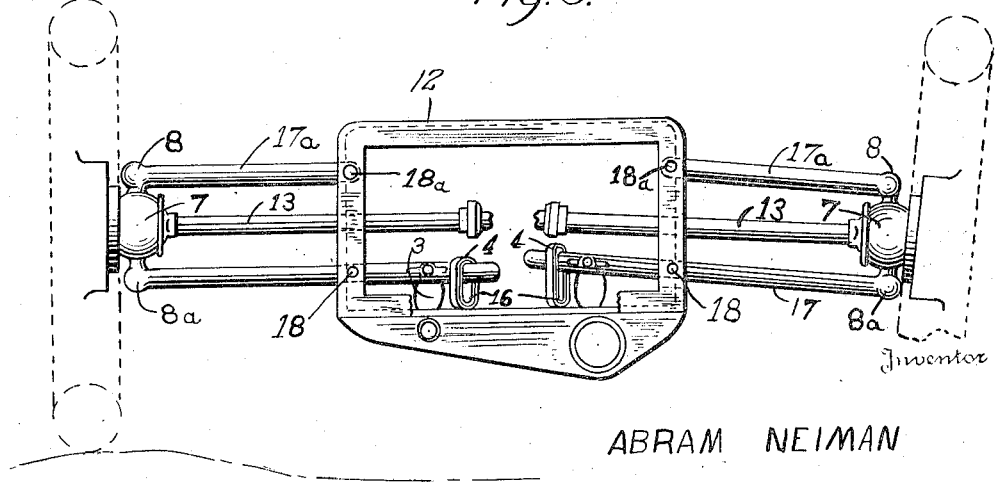

2,075,746

UNITED STATES PATENT OFFICE 2,075,746

SUSPENSION AND SPRINGING MEANS FOR MOTOR-CARS AND MOTOR VEHICLES

Abram Neiman, Cologne, Germany

Application August 7, 1934, Serial No. 738,881
In Germany August 7, 1933

5 Claims. (Cl. 267—21)

The present invention relates in general to suspension or spring assemblies for vehicles having amongst its principal objects the provision of an improved suspension and axle assembly for motor driven vehicles which, while being fully resilient and sensitive to minor vibrations or shocks, will absorb the more serious impacts and jars with minimum recoil and rebound of the vehicle body.

Other objects of the invention will be in part obvious and in part pointed out hereinafter.

In order that the invention and its mode of operation may be readily understood by persons skilled in the art, I have in the accompanying illustrative drawing and in the detailed following description set out an embodiment of the same.

In the accompanying drawing, which gives, by way of examples, some practical embodiments of my invention:

Fig. 1 is a diagrammatic view of a suspension for motor-car.

Fig. 2 is a similar view, concerning the combination of rubber members, working the ones to the traction and the other to the compression.

Fig. 3 is a modification of the preceding arrangement.

In the suspension of Fig. 1, the half-axles 1 are fixed in joints or articulations 2 of the frame of the vehicle. This frame bears or supports a threaded spindle 6 upon which are mounted or applied, in such manner as to be capable of moving up and down, the upper rollers of support of rubber trains 4'. The lower rollers for these rubber trains lay upon the half-axles 1. When using rubber trains, arranged one in another, or near one another, of diverse lengths or of diverse powers, I obtain a stepped suspension. Thus, by example, the train 4" is longer than the train 4', and therefore enters in action only where the normal elasticity of the train 4' is overstressed. The dampening of the vibrations is made by means of rubber buffers or pads 10 fixed to the frame of the vehicle.

In numerous cases, it is advantageous to make use of the combination of a rubber member working under tension with another rubber member working under compression, in such a manner that the suspension ensures or supplies the dampening by means of stepped rubber trains, in which case the rubber dampens the compression, i. e. forms buffers or pads. Such an embodiment is advantageous where a hard suspension and a very high dampening are desired.

In the device of Fig. 2 relative to this embodiment, the inner ends of the half-axles 1 lay upon buffers or pads 3. The same are arranged in an adjustable manner in guides 5. The dampening is supplied by means of the rubber trains 4.

The modification of Fig. 3 shows the adaptation of such a suspension to the wheels which are used for both driving and steering. In this modification, the fixed arms 17, 17a bears or rests, through the spherical bearing or joint, upon the spherical head or knee 8, 8a of the member 7, formed and shaped in a corresponding manner, for receiving the wheel and on the other hand said members 17, 17a oscillates about the joints 18, 18a which are fixed into the frame 12 of the vehicle. On the right and on the left, each arm forms a parallelogram 18a, 8, 8a, 18. In each of the same, one arm is extended, by example the lower arm, which by its inner end, loads the rubber buffer or buffers 3. The bearing point of the suspension can be arranged between the laying position and the hub. Inside the basket 12 in form of a U, are arranged the driving joints 14 of the motor-block, the Cardan shafts 13 which are connected with the Cardan joints. Arms 17 are extended inside in 17'. By sliding the rubber bearing 3 in a slot 15 in extension 17', the lever relation is modified. Also, 16 is an attaching point of the rubber train 4, which here acts as a shock absorber.

Obviously, other modifications can be made without departing from the spirit and scope of my invention, as defined in the appended claims.

What I claim and desire to secure by Letters Patent in U. S. A. is:

1. A suspension and springing means for motor vehicles comprising a pair of half-axles, a supporting frame connected to said vehicle, pivoting means connecting said axles to said frame, elongated resilient bands connecting said frame and said half-axles, and resilient means mounted on said frame for intercepting said axles.

2. A suspension and springing means for motor vehicles comprising a plurality of half-axles, a supporting frame connected to said vehicle, a rectangular frame mounted on said supporting frame, pivoting means pivotally connecting said half-axles to said rectangular frame, elongated resilient bands connecting said rectangular frame and a pair of said half-axles, and resilient means mounted on said rectangular frame for intercepting said pair of half-axles.

3. A suspension and springing means for motor vehicles comprising a pair of half-axles, a supporting frame connected to said vehicle, pivoting means connecting said axles to said frame, elongated resilient bands connecting said frame and said half-axles, said resilient bands being different lengths whereby a progressive suspension will be effected between the said frame and said half-axles so connected, and resilient means mounted on said frame for intercepting said axles.

4. A suspension and springing means for motor vehicles comprising a plurality of half-axles, a supporting frame connected to said vehicle, a rectangular frame mounted on said supporting frame, pivoting means pivotally connecting said half-axles to said rectangular frame, elongated resilient bands connecting said rectangular frame and a pair of said half-axles, resilient means mounted on said rectangular frame for intercepting said pair of half-axles, and adjustable guides for connecting said resilient means mounted on said rectangular frame with said half-axles.

5. A suspension and springing means for motor vehicles comprising a pair of half-axles, a supporting frame connected to said vehicle, pivoting means connecting said axles to said frame, elongated resilient bands, one end of said bands being connected to said half-axles, a support mounted upon said supporting frame, means for adjustably connecting the opposite ends of said bands to said support, and resilient means mounted on said frame for intercepting said axles.

ABRAM NEIMAN.